United States Patent
Bauchot et al.

(10) Patent No.: US 7,363,348 B2
(45) Date of Patent: Apr. 22, 2008

(54) METHOD AND SYSTEM IN AN OFFICE APPLICATION FOR PROVIDING CONTENT DEPENDENT HELP INFORMATION

(75) Inventors: Frederic Bauchot, St Jeannet (FR); Yves-Nicolas Etorre, Juan les Pins (FR); Albert Harari, Nice (FR); Catherine Soler, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 10/478,120

(22) PCT Filed: May 23, 2002

(86) PCT No.: PCT/EP02/06926

§ 371 (c)(1),
(2), (4) Date: Nov. 20, 2003

(87) PCT Pub. No.: WO02/097608

PCT Pub. Date: Dec. 5, 2002

(65) Prior Publication Data

US 2004/0139073 A1    Jul. 15, 2004

(30) Foreign Application Priority Data

May 29, 2001  (EP) .................................. 01480043

(51) Int. Cl.
*G06F 15/16* (2006.01)
*G06F 7/00* (2006.01)

(52) U.S. Cl. .............................. 709/217; 707/1; 707/2; 707/3; 707/4; 707/5; 709/201; 709/203; 709/218; 709/219

(58) Field of Classification Search ................ 709/217, 709/218, 219, 201, 202, 203; 707/1, 3, 4, 707/5, 100
See application file for complete search history.

(56) References Cited

U.S. PATENT DOCUMENTS 5,033,009 A * 7/1991 Dubnoff ...................... 715/503
5,603,021 A * 2/1997 Spencer et al. ................ 707/4

(Continued)

FOREIGN PATENT DOCUMENTS

| GB | 2 348 523 A | 10/2000 |
|---|---|---|
| GB | 2348523 A | 10/2000 |
| JP | 03-017740 | 1/1991 |
| JP | 04-030249 | 2/1992 |
| JP | 07-020979 | 1/1995 |

OTHER PUBLICATIONS

"Expanding a Field to Fill in More Information or Clarify Its Content," *IBM Technical Disclosure Bulletin*, 36:06A 493 (Jun. 1993).

(Continued)

*Primary Examiner*—Saleh Najjar
*Assistant Examiner*—Farzana Huq
(74) *Attorney, Agent, or Firm*—William H. Steinberg, Esq.; Kevin P. Radigan, Esq.; Heslin Rothenberg Farley & Mesiti, P.C.

(57) ABSTRACT

Method, system and program product for providing on-line help information in an office application which includes one or more objects. The on-line help information is dependent on content of a selected object of the office application. A user of the office application is provided with help information setting forth an example directly derived from content of a currently selected object or cell. Content of a user entry field within the object is parsed to determine whether a predefined keyword is present, and if so, at least one parameter associated with the keyword and at least one format or rule related to the at least one parameter are identified. The at least one format and rule specified in the help information are employed in correcting content of the user entry field, for example, for display to the user.

9 Claims, 12 Drawing Sheets

U.S. PATENT DOCUMENTS

| | | | | |
|---|---|---|---|---|
| 5,694,559 | A | * | 12/1997 | Hobson et al. ............. 715/705 |
| 5,845,300 | A | * | 12/1998 | Comer et al. ............... 715/508 |
| 6,009,422 | A | * | 12/1999 | Ciccarelli ...................... 707/4 |
| 6,029,165 | A | * | 2/2000 | Gable ............................ 707/3 |
| 6,094,649 | A | * | 7/2000 | Bowen et al. ................. 707/3 |
| 6,108,686 | A | * | 8/2000 | Williams, Jr. ............... 709/202 |
| 7,155,667 | B1 | * | 12/2006 | Kotler et al. ............... 715/513 |

OTHER PUBLICATIONS

International Search Report corresponding to PCT/EP02/06926 dated Jan. 5, 2004.

Cobb, S., *Using Qualtro Pro 2*, Borland-Osborne/McGraw Hill, 1990.

LeBlond et al. *Using 1-2-3*, Que Corp. 1985.

*Microsoft Mouse Programmer's Reference*, Microsoft Press, 1989.

Petzold, Co., *Programming Windows*, Second Edition, Microsoft Press, 1990.

Quattro Pro for Windows, *Getting Started*, Boland International, 1992.

Quattro Pro for Windows, *User's Guide*, Boland International, 1992.

Quattro Pro for Windows, *Building Spreadsheet Applications*, Boland International, 1992.

Nobuyuki Abe, "The Complete Guide of Excel 97: The Supporting Function of Numerical Formula Input", The Windows, Softbank Co., (Apr. 1, 1997), pp. 86-87, vol. 7, No. 4.

* cited by examiner

| Keyword | Argument template | TextPtr |
|---|---|---|
| 302 | 303 | 304 |

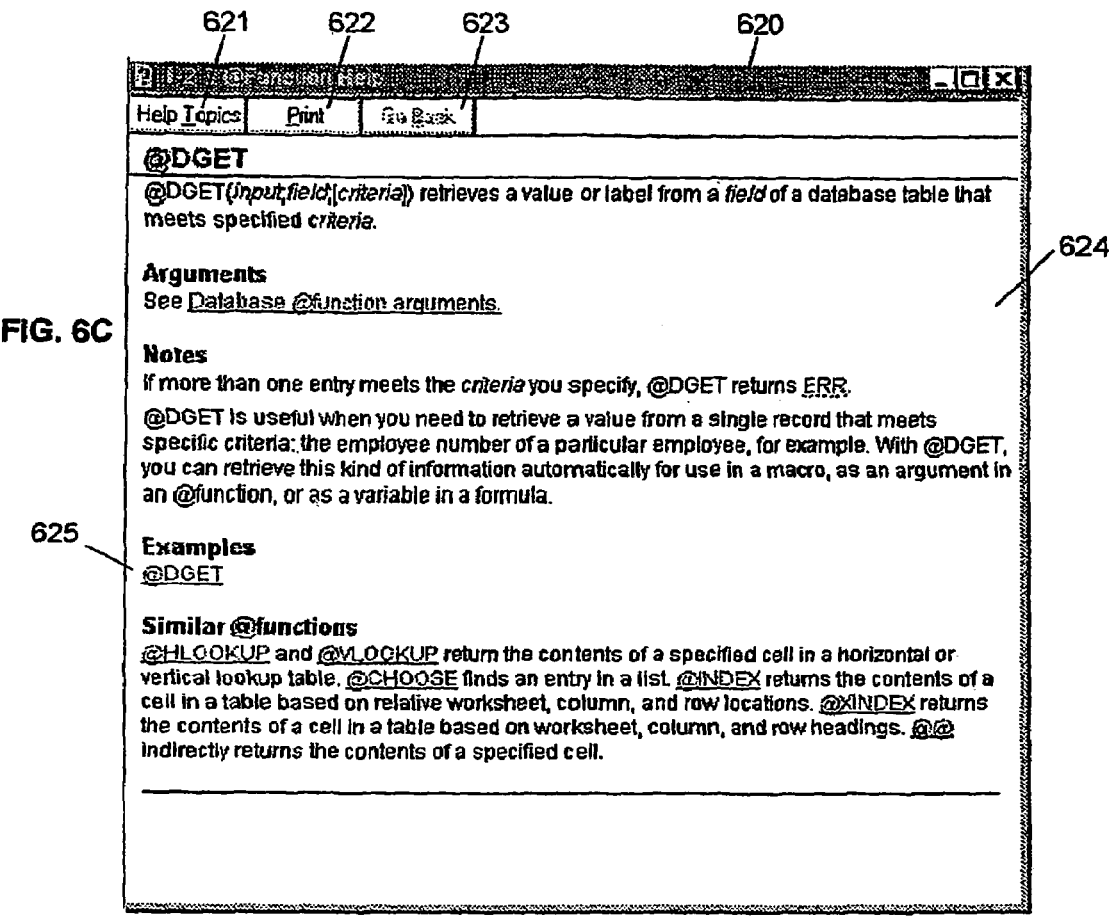

METHOD AND SYSTEM IN AN OFFICE APPLICATION FOR PROVIDING CONTENT DEPENDENT HELP INFORMATION

RELATED APPLICATION

This application is a national stage application of and claims priority from PCT Application PCT/EP02/006926, filed May 23, 2002, which claims priority from European Application No. 01480043.7, filed May 29, 2001. These disclosures are hereby incorporated by reference herein in their entireties. The above PCT International Application was published in the English language and has International Publication No. WO 02/097608 A2.

TECHNICAL FIELD OF THE INVENTION

The present invention relates to the field of information processing by digital computers, more particularly to a method and system, in an office application such as an electronic spreadsheet, for providing help information which depends on the content of the current selected spreadsheet cell.

BACKGROUND ART

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-lefthand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and-numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsbomelMcGraw-MII, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas and/or built-in functions for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Besides the existence of user manuals, such as user's guides, conventional electronic spreadsheet tools comprise built-in Help facilities for displaying on-line Help information on the user screen. This capability has significantly improved the usability and ergonomy of the electronic spreadsheet tools as they come within a self-standing environment unifying several facets of the tool, such as the operational one, and the educational one. Furthermore some techniques allow the presentation of a context-dependent on-line Help information, so that the user receives the relevant Help information in view of the current context of the tool. For instance, within a dialog box aimed to assist the spreadsheet user for file oriented manipulations, the on-line Help information will only provide Help information corresponding to these file manipulations.

Built-in functions used within formulas to automate the computations in a spreadsheet can be quite complex and hence difficult to tune and to update. It is therefore desirable to rely on the Help information to understand how to use such built-in functions. With conventional electronic spreadsheet tools, such Help information related to built-in functions, usually explains the purpose of the function, specifies which arguments are expected, may give some hints on classical misuse and finally illustrates the function through an example. All this information may be voluminous and sometimes difficult to understand by the "average user" for the most complex functions. This is specially the case when the example used to illustrate the function is really different from the practical case faced by the user. In such a case, the on-line Help information does not really help as it does not match one way or the other the data manipulated by the spreadsheet user. This problem is solved by the present invention which relates to data processing and more particularly to a user interface preferably in a spreadsheet, for providing an on-line content sensitive Help. This content sensitive Help concerns objects, like spreadsheet cells, whose content is entered and manipulated by the user. The content sensitive Help is different to the context sensitive Help (considered as the prior art) in that it is not related to a space-time environment—the space context being defined with means of physical/geographical coordinates on the user's screen, the time context being defined through the logical sequence of the different tasks and routines. The content of an object is entered by the user. As user's entry, the content of an object must satisfy to a particular rule, syntax, grammar or orthography. For instance, a user's entry can be a value, a formula, a code, or a programming language with predefined numeric numbers, parameters, keywords, or statements. It is a further object of the content sensitive Help to provide the user with examples that are not generic but are customized to be consistent with the set of objects already defined. The aim of such a function is to give the possibility to the user to import or to copy/paste these examples in the entry fields with the minimum amendments.

SUMMARY OF THE INVENTION

As defined in independent claims, the present invention discloses a system, method and computer program for providing on-line help information in an office application comprising one or a plurality of objects, said on-line help information being dependent on the content of a selected object. The method comprises the steps of:
  detecting an on-line help command as a result of a user action;
  identifying a selected object;
  determining if the selected object comprises a user entry field;

if the selected object comprises a user entry field:
  identifying the content of said user entry field;
  parsing the content of the user entry field to identify if any predefined keyword is present, a keyword being characterized by a character string;

for each predefined keyword identified in the content of the user entry field:
  identifying a predefined help information, if any, associated with the identified keyword, said help information specifying one or a plurality of parameters associated with said keyword; and one or plurality of formats and rules related to said one or plurality of parameters;
  parsing the content of the user entry field to identify the one or plurality of parameters specified in said predefined help information;
  verifying that formats of the one of plurality of parameters within the user entry field satisfy formats specified in the predefined help information;
  verifying that the one or plurality of parameters within the user entry field satisfy the rules specified in the predefined help information;

if the content of the user entry field does not satisfy a format or a rule specified in the help information of a predefined keyword identified in the content of the user entry field:
  correcting the content of the user entry field according to the one or plurality of formats and rules specified in the help information.

Further embodiments of the invention are provided in the appended dependent claims.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 3 illustrates the structure of the "Content Dependent Keyword Table" (CDK Table), according to the preferred embodiment of the present invention.

FIGS. 6A, 6B, 6C, 6D and 6E show conventional dialog boxes used to display on-line Help information, and a preferred user interface original dialog box used to display content dependent on-line Help information according to the preferred embodiment of the present invention.

DETAILED DESCRIPTION OF THE PREFERRED EMBODIMENT

System Hardware

Figure 1A:
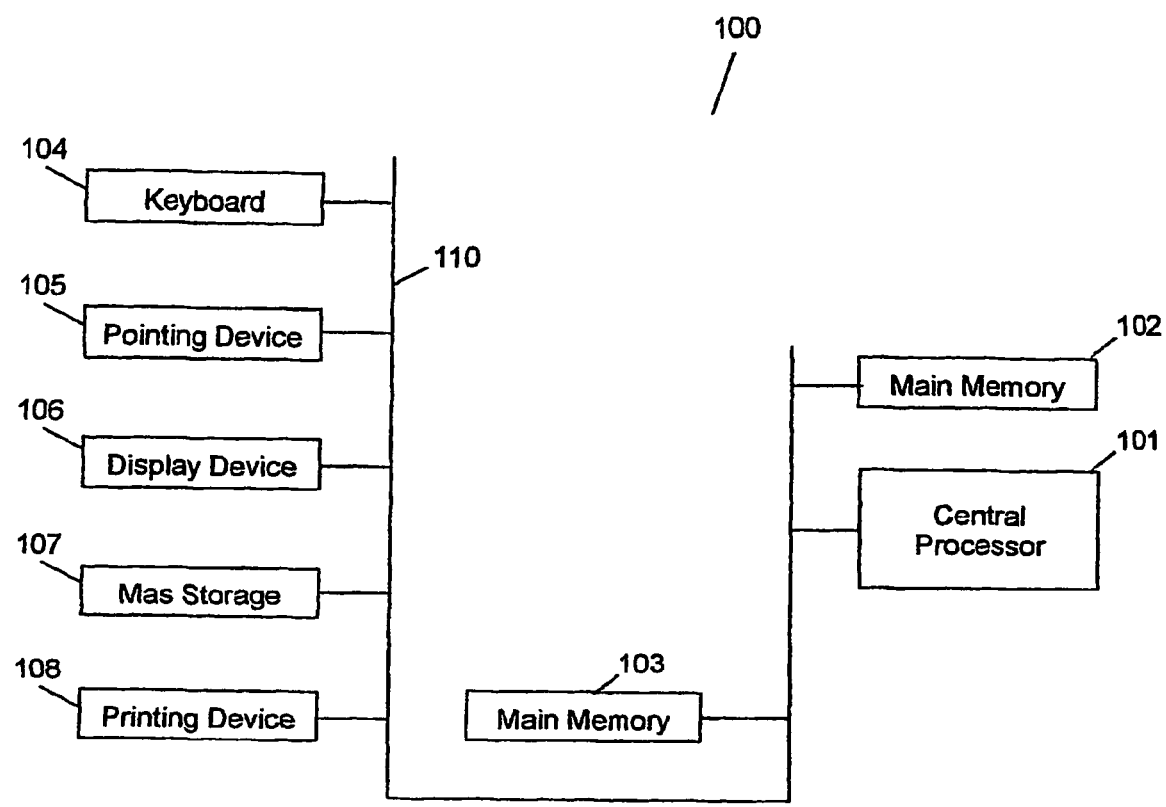
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
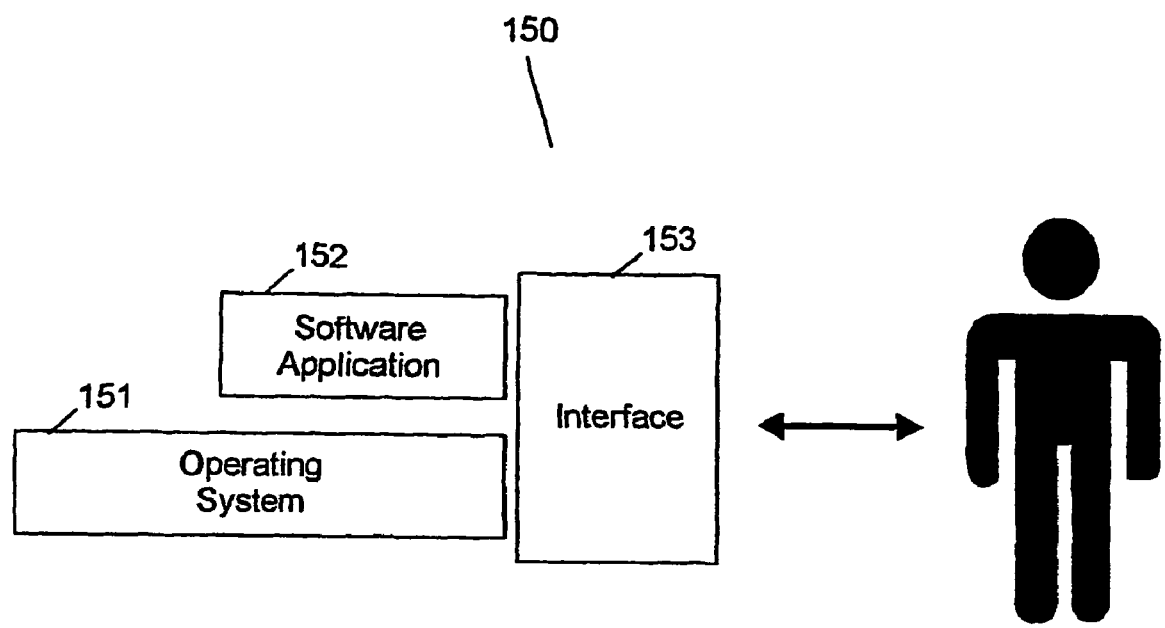
FIG. 1B is a schematic view a software system including an operating system, an application software, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
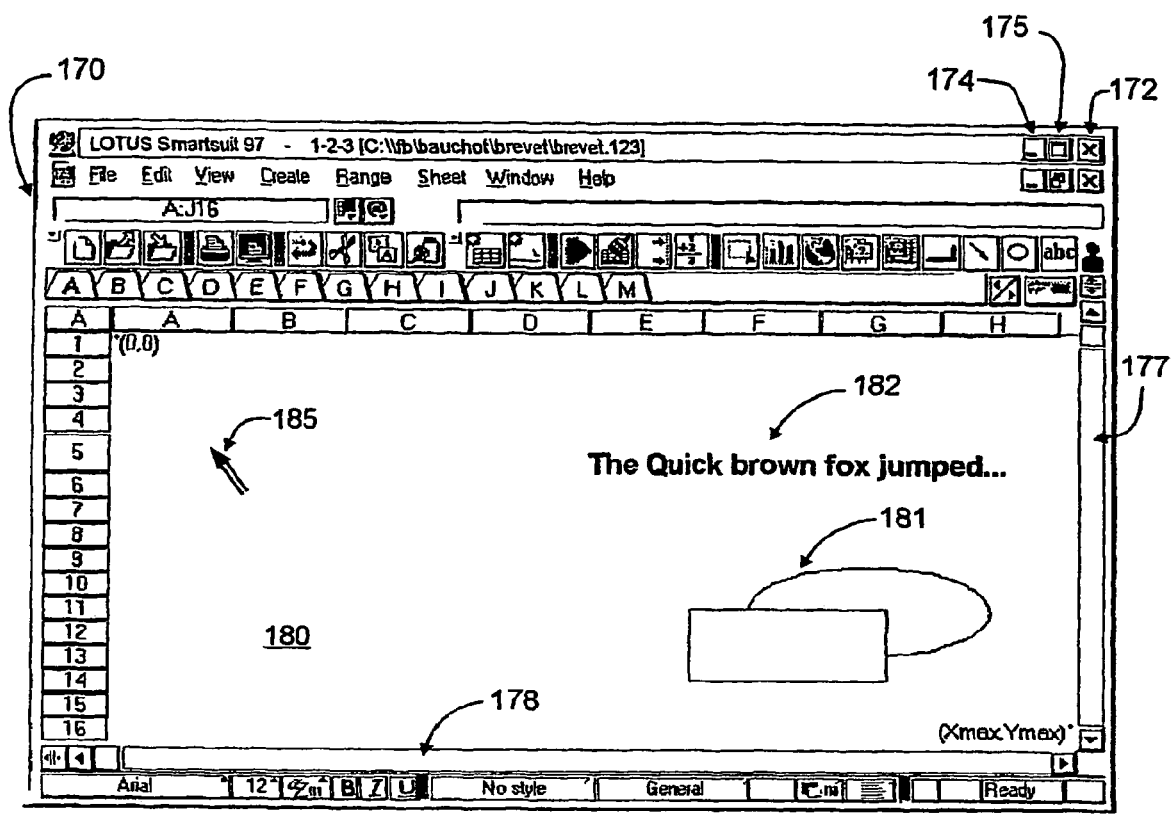
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figure 2A:
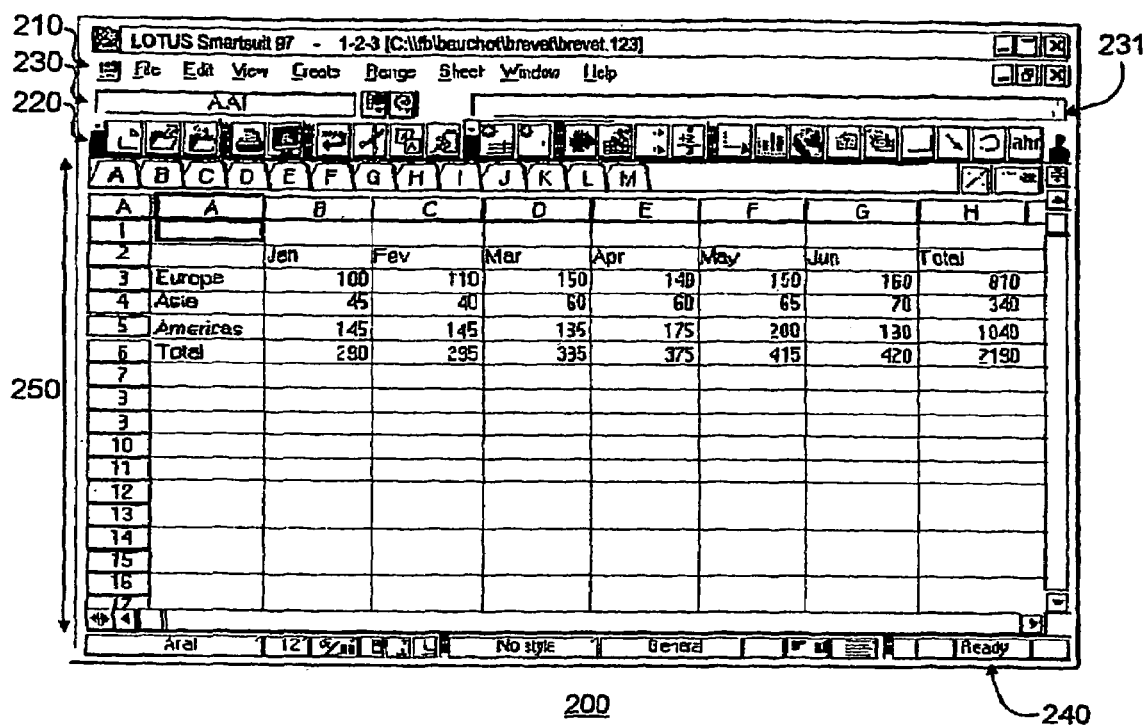
FIG. 2A shows a spreadsheet notebook interface according to the preferred embodiment of the present invention.

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
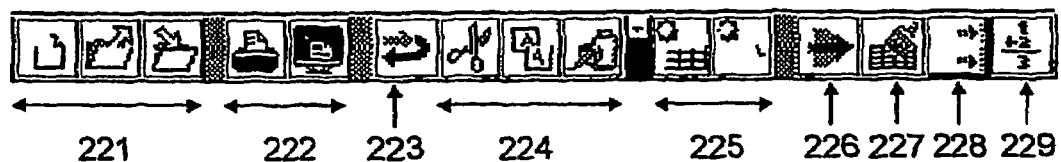
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
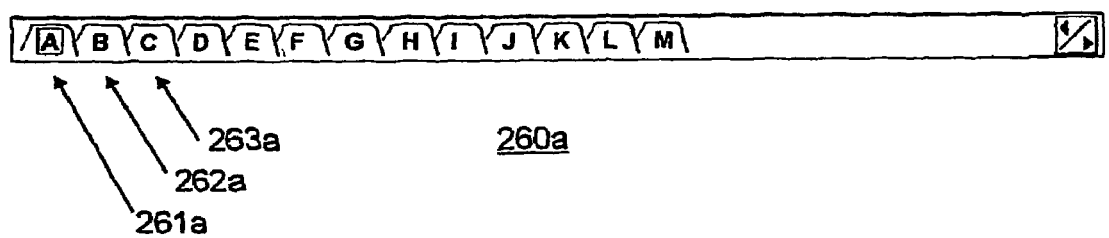
FIGS. 2C and 2D show page identifiers for rapidly accessing and manipulating individual pages of the notebook interface shown in FIG. 2A.
Figure 2D:
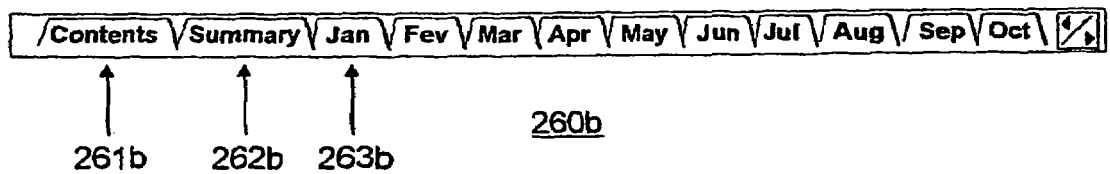

As shown in FIGS. 2C-D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Content Dependent On-Line Help Information

A. Introduction

Conventional electronic spreadsheets include built-in means allowing spreadsheet users to easily display on their display device 106 on-line Help information. Typical examples of such means are push-button objects, or menu or sub-menu entries, or short-cut commands that a spreadsheet user can trigger by either clicking with the pointing device 105, or keying on the keyboard 104.

Figure 5A:
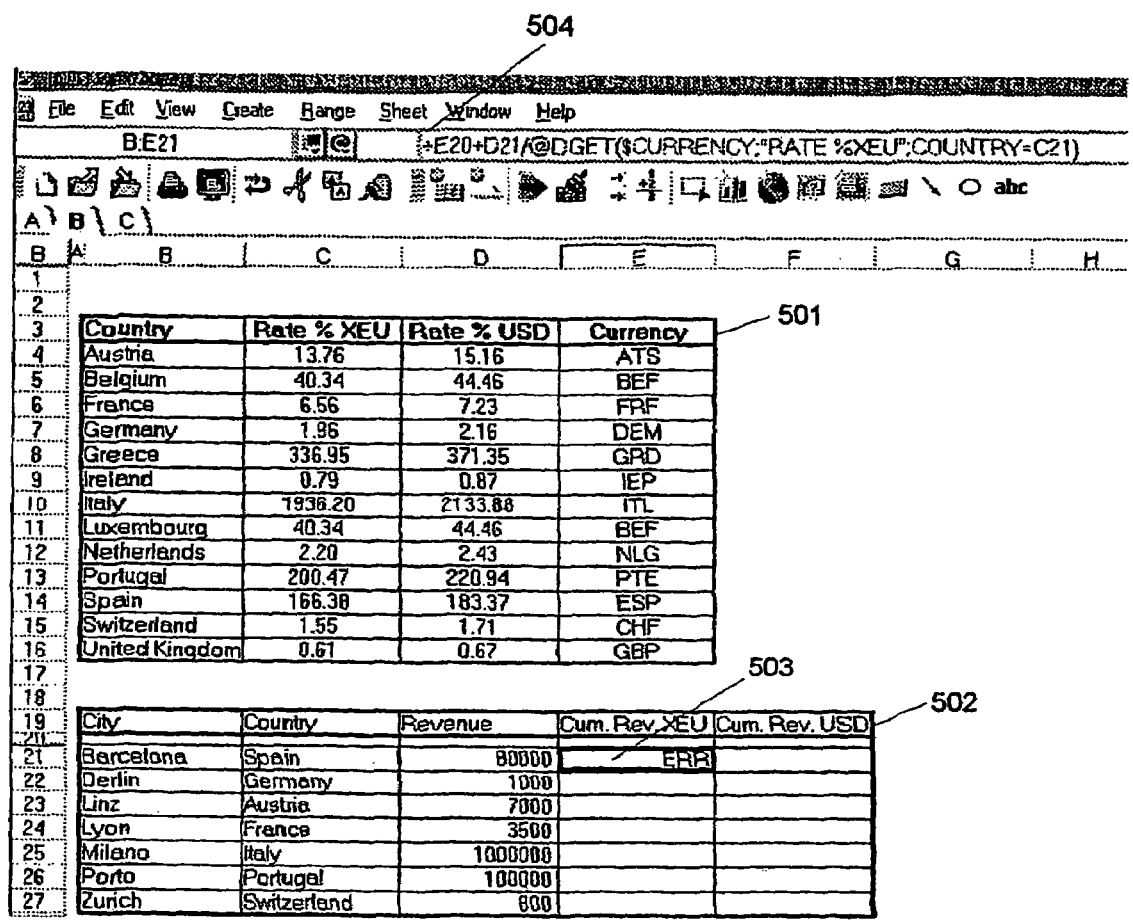
FIGS. 5A and 5B show a preferred spreadsheet user interface illustrating the benefit of the invention in a preferred embodiment.

This is illustrated in the example of FIG. 5A showing a portion of the display device 106 where two tables are defined. The first range of cells 501 with address B3 . . . E16 corresponds to a table recording European currency information, with:

the first leftmost column showing a country,
the second column showing the exchange rate with respect to the Euro,
the third column showing the exchange rate with respect to the US Dollar, and
the fourth rightmost column showing the currency ISO code.

This range 501 has received the name CURRENCY and can be referred to through formulas in some cells for determining an exchange rate from a country information.

The second range 502 with address B19 . . . F27 corresponds to a table showing European branch office revenue, as well as a cumulated revenue both in Euro and US Dollar. In this second range 502:

the first leftmost column shows the branch location city,
the second column shows the branch office country,
the third column shows the branch revenue expressed in local currency,
the fourth column shows the cumulated revenue expressed in Euro, and
the fifth rightmost column shows the cumulated revenue expressed in US Dollar.

For computing the cumulated revenue within the fourth column of range 502, the spreadsheet user first select through conventional means, such as the pointing device 105 or the keyboard 104, the cell 503 with address E21, so that this cell becomes the currently selected cell. Then the spreadsheet user can use the keyboard 104 to fill the currently selected cell 503 with the relevant formula, as shown in the edit window 504. In the example shown in FIG. 5A, the content of the currently selected cell 503 corresponds to:

"+E20+D21/@DGET($CURRENCY;"RATE % XEU";COUNTRY=C21)".

As soon as the content of the cell does not comply with the rules associated to the syntax and/or vocabulary defined in the spreadsheet environment, then this cell exhibits an "ERR" value, as shown by 503.

Figure 6A:
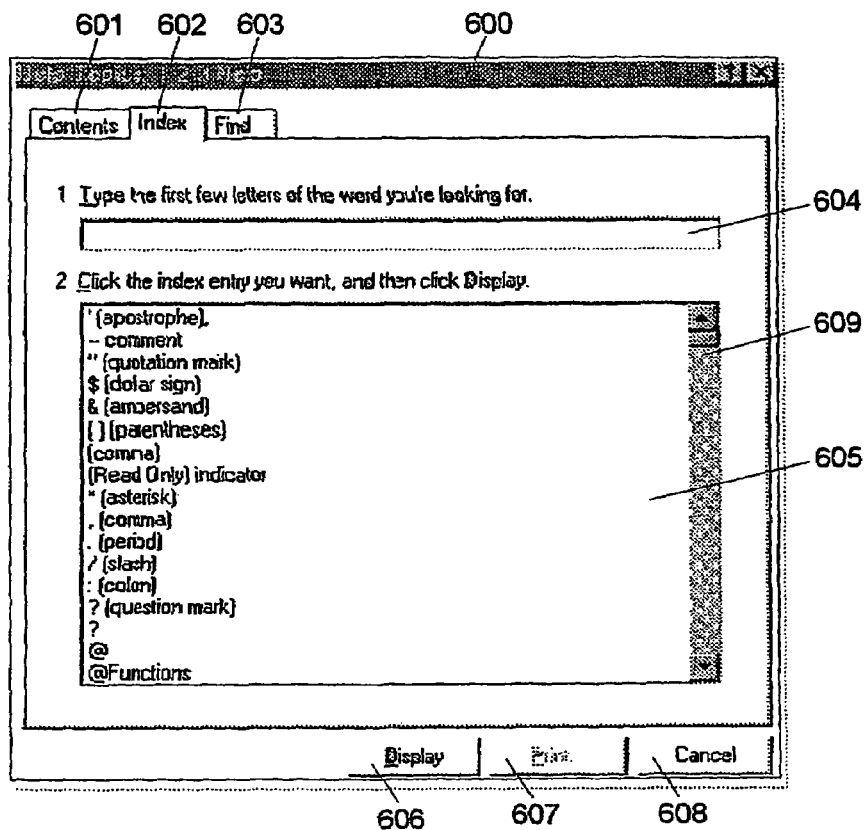

In such a situation, the spreadsheet user can typically invoke the built-in on-line Help tool to understand what explains this "ERR" value. For this purpose conventional means available in electronic spreadsheet tools, such as pointing device 105 or keyboard 104, can be used for displaying on the display device 106 a first user interface dialog box 600, entitled "Help Topics" as shown by FIG. 6A. This dialog box 600 contains three folders 601, 602 and 603.

The first folder 601 presents a "Table of Content" like interface allowing the spreadsheet user lo navigate within all the on-line Help information as if he/she was reading a book.

The third folder 603 presents a "Search Engine" interface allowing the spreadsheet user to locate all the occurrence of a user-specified character string within the whole on-line Help information.

Figure 6B:
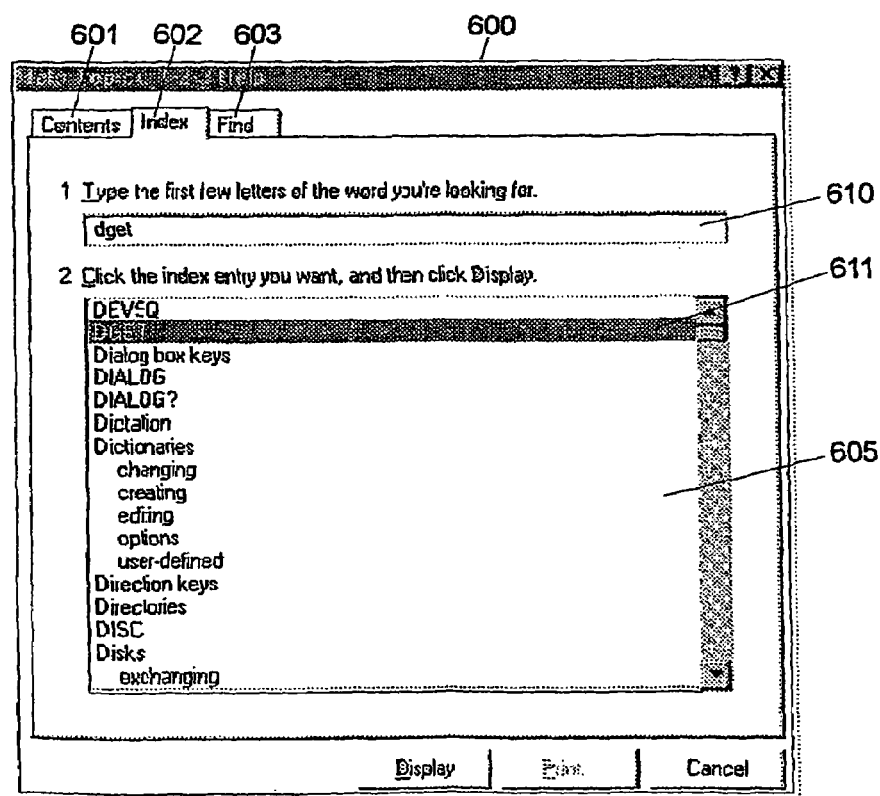

The second folder 602 presents an "Index" like interface allowing the spreadsheet user to navigate through the whole on-line Help information by specifying predefined index entries. This index entry specification can be done in two ways:

With the first way, the spreadsheet user can use the keyboard 104 to type the first letters of the index entry in a dedicated entry field 610, as shown on FIG. 6B. By recognizing the first valid index entry preceding the specified letters according to the alphabetic order, the content of the window 605 is updated to show the resulting index entry selection.

With the second way, the spreadsheet user can directly use the pointing device 105 to select an entry within the window 605 or to navigate within this window 605 thanks to the elevator 609.

Whether method is used, an index entry 611 is selected within the window 605 of the dialog box 600. In our scenario, the spreadsheet user has selected "DGET" for the index entry as he/she suspects to have misused the "@DGET" built-in function in the content of the currently selected cell 503.

The next step consists for the spreadsheet user to use the pointing device 105 to click on the push-button 606 entitled "Display". As a result a new dialog box 620 is displayed on the display device 106, as illustrated on FIG. 6C. This new dialog box 620 contains several objects 621, 622, 623, and 624 described hereafter:

The push-button 621 entitled "HelpTopics" allows to revert back to the preceding dialog box 600.
The push-button 622 entitled "Print" allows to print the content of the dialog box 620 on the printing device 108.
The push-button 623 entitled "Go Back" allows to return back (if any) to the previously displayed content of the same dialog box 620.
Finally the window 624 shows the on-line Help information corresponding to the index entry selected at the previous step. This information may contain some hypertext references so that further information can be directly displayed. This is illustrated by the reference 625 which points to an example of the @DGET built-function. If the spreadsheet user clicks with the pointing device 105 on the hypertext reference 625, a new dialog box 630 is displayed on the display device 106, as shown in FIG. 6D.

This new dialog box 630 contains several objects 631, 632, 633, and 634 described hereafter:

The push-button 631 entitled "HelpTopics" allows to revert back to the preceding dialog box 600.
The push-button 632 entitled "Print" allows to print the content of the dialog box 630 on the printing device 108.
The push-button 633 entitled "Go Back" allows to return back (if any) to the previously displayed content of the same dialog box 630.
Finally the window 634 shows the on-line Help information corresponding, in our scenario, to the example of the @DGET built-in function. This example is based on a dummy table 635, whose nature, content, size is fixed. By comparing the built-in function syntax illustrated in this dummy example shown in the window 634 of the dialog box 630 with the content of the currently selected cell 503 as shown in the edit window 504, the spreadsheet user is poorly armed to understand the reason of the ERR value. More generally, the spreadsheet user may easily encounter some similar situations where the on-line help information is of very little help (that is paradoxical . . . ) because it does not assist the user to correct errors.

The present invention offers a user-friendly solution to these problems by allowing the electronic spreadsheet user to receive a new mode of on-line Help information which provides an example directly derived from the content of the currently selected cell. In the following, the corresponding new on-line Help method will be referred to as the "Content Dependent Help" method.

B. Content Dependent Keyword Table

The display of on-line content dependent Help information on the display device 106 according to the Content Dependent Help method results from a spreadsheet user action. When this operation occurs, a common repository, called "Content Dependent Keyword Table" (or CDK table for short), is used to identify if the content of the currently selected cell comprises a keyword justifying to display the on-line Help information according to the present invention. This CDK Table is preferably saved on a non volatile memory (typically but not necessary as part of the spreadsheet disk file on the mass storage 107).

Referring to FIG. 3, the CDK Table 300 corresponds to a logical simple structure made of several records 301, each of them corresponding to a keyword associated with content dependent Help information, according to the present invention. Each record includes three fields:

The "Keyword" 302 field is used for recording the character string which uniquely identifies a keyword.

The "Parameter Template" 303 field (also called "Argument Template") is used for describing the formats and rules governing the specification of parameters, if any, associated with the keyword identified by the "Keyword" field 302. Several conventional notation techniques can be used for describing such parameter template. These notation techniques do not influence in any way the spirit of the present invention. Note that the terms "parameter" and "argument" will be used indifferently in the present description. In a preferred embodiment of the present invention, a keyword can correspond to a build-in predefined function that must be invoked with a set of parameters according to predefined formats and/or predefined rules.

The "TextPtr" 304 field is a reference pointing to the memory location where is recorded the Help information text associated to the keyword identified by the "Keyword" field 302. This memory location can either be on the Mass storage 107, or on the main memory 102, or on other conventional memory repository means, without departing from the spirit of the present invention.

The construction and update of this table is itself conventional and strait forward. Any keyword candidate for taking advantage of the present invention must be associated with a specific record 301 within the CDK table 300. The various means used for either adding, removing or updating records 301 within the CDK table 300 are implementation dependent and are therefore not considered as part of the present invention.

C. Scenario

In contrast to just-described conventional tools, the present invention provides a more powerful, user-friendly and interactive approach for providing on-line content dependent Help information, in a form of a so-called "Content Dependent Help" method.

In a preferred embodiment, the present invention is used in two steps:

1. The first step occurs when the spreadsheet user decides, based on some criteria not detailed here, to select a given cell and possibly to fill or update its content.

The user first selects the relevant cell by using conventional means, such as but not limited to the pointing device 105 or the keyboard 104.

Then the user can enter the cell edit mode for updating or filling the content of the selected cell by using conventional means (typically the keyboard 104).

2. The second step occurs when the spreadsheet user decides, based on his or her own criteria not detailed here, to take advantage of the present invention for displaying content dependent Help information.

The spreadsheet user invokes an original specific command called "Content Dependent on-line Help" thanks to conventional means available in spreadsheet environment, such as (but not limited to) dedicated push-buttons, keyboard entry short cuts, menu or sub-menu entries. In a preferred embodiment of the present invention, the Content Dependent on-line Help command is invoked by using the same set of means as the one available in conventional electronic spreadsheets for displaying conventional on-line Help information, such as (but not limited to) clicking with the pointing device 105 on a "Help" menu entry, or keying the "F1" key on the keyboard 104.

Figure 6E:
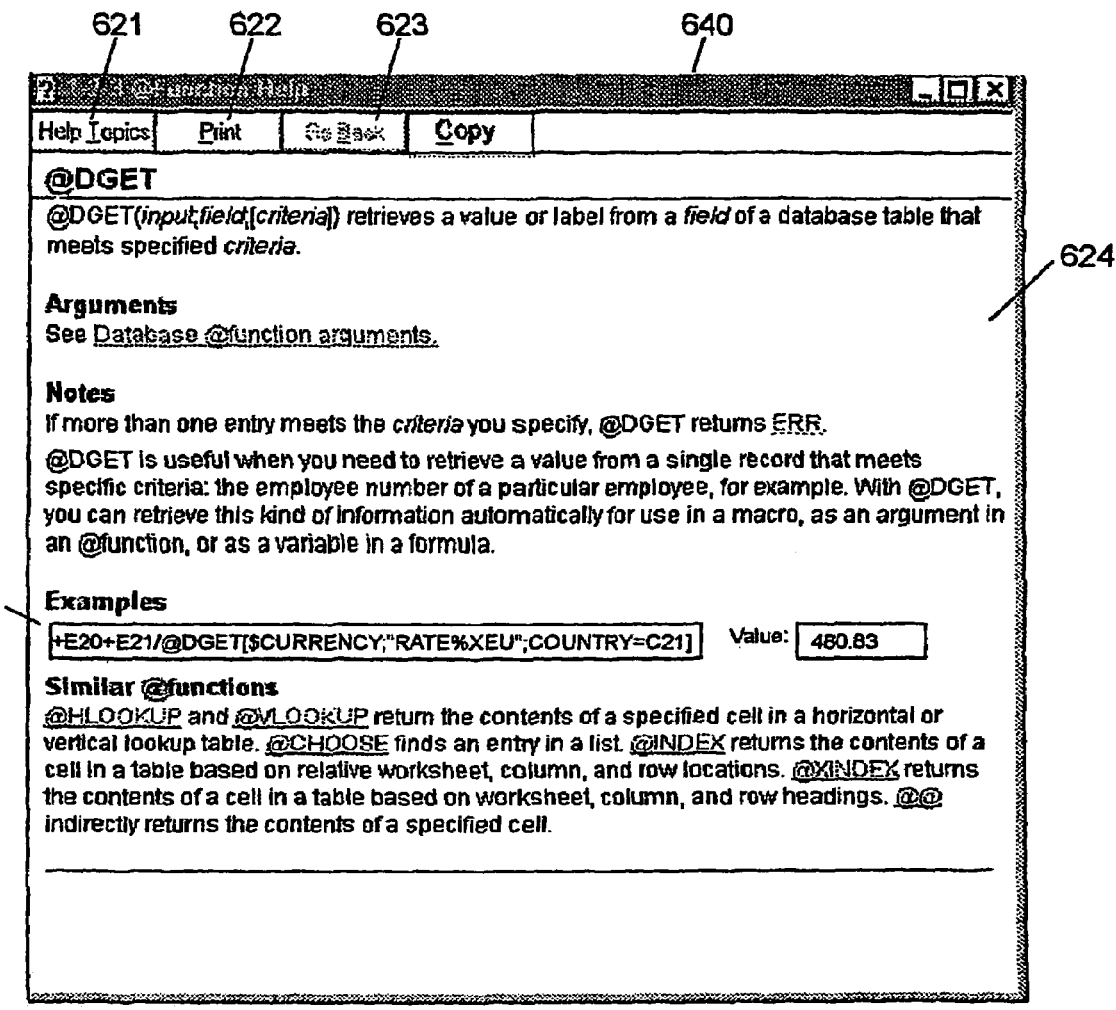

This can be illustrated with the same scenario as the one previously described in FIG. 5A, where a spreadsheet user first selects a cell 503 and then fills it with the content:

"+E20+D21/@DGET($CURRENCY,"RATE % XEU",COUNTRY=C21)"

resulting into an "ERR" value. In such a situation, the spreadsheet user can typically invoke the built-in on-line Help tool to understand what means this "ERR" value. According to the preferred embodiment of the present invention, the conventional means available in electronic spreadsheet tools, such as pointing device 105 or keyboard 104, can be used for directly triggering the display of an original on-line help information dialog box 640 on the display device 106, as shown in FIG. 6E. The displayed information is tailored to the content of the currently selected cell 503.

As a first advantage over conventional methods, the present invention allows to directly display the on-line Help information pertinent to the content of the currently selected cell. The intermediary steps, as described in FIG. 6A, 6B, 6C and 6D, are merged into a single step corresponding to the display of the dialog box 640. In the example of FIG. 6E, the dialog box 640 exhibits on-line Help information related to the @DGET built-in function.

As a second advantage over conventional methods, the information contained in the dialog box 640 is more relevant for the spreadsheet user than the conventional one as illustrated in the dialog boxes 620 and 630 of FIG. 6C and 6D respectively. Indeed, the dialog box 640 contains the same objects 621, 622, 623, 624 as the dialog box 620, but in addition it also contains new fields as described hereafter. The new field 642 is a display window which is automatically filled according to the method of the present invention with a content derived from the content of the currently selected cell 503, but corrected according to the formats and rules related to the parameters associated with the @DGET built-in function. In the example shown in FIG. 6E, the correction applied to the working buffer content relates to the second parameter which should be a valid header of the range identified in the first parameter. The "ERR" value was resulting from the fact that the user has typed "RATE % XEU" which is unfortunately a misspelled header. The correction applied to the working buffer consists in using by default the second leftmost header in the table referenced in the first parameter, that is "RATE % XEU" in the depicted example. The new field 643 is a display window showing the value taken by a cell if its content corresponds to the display window 642.

Figure 5B:
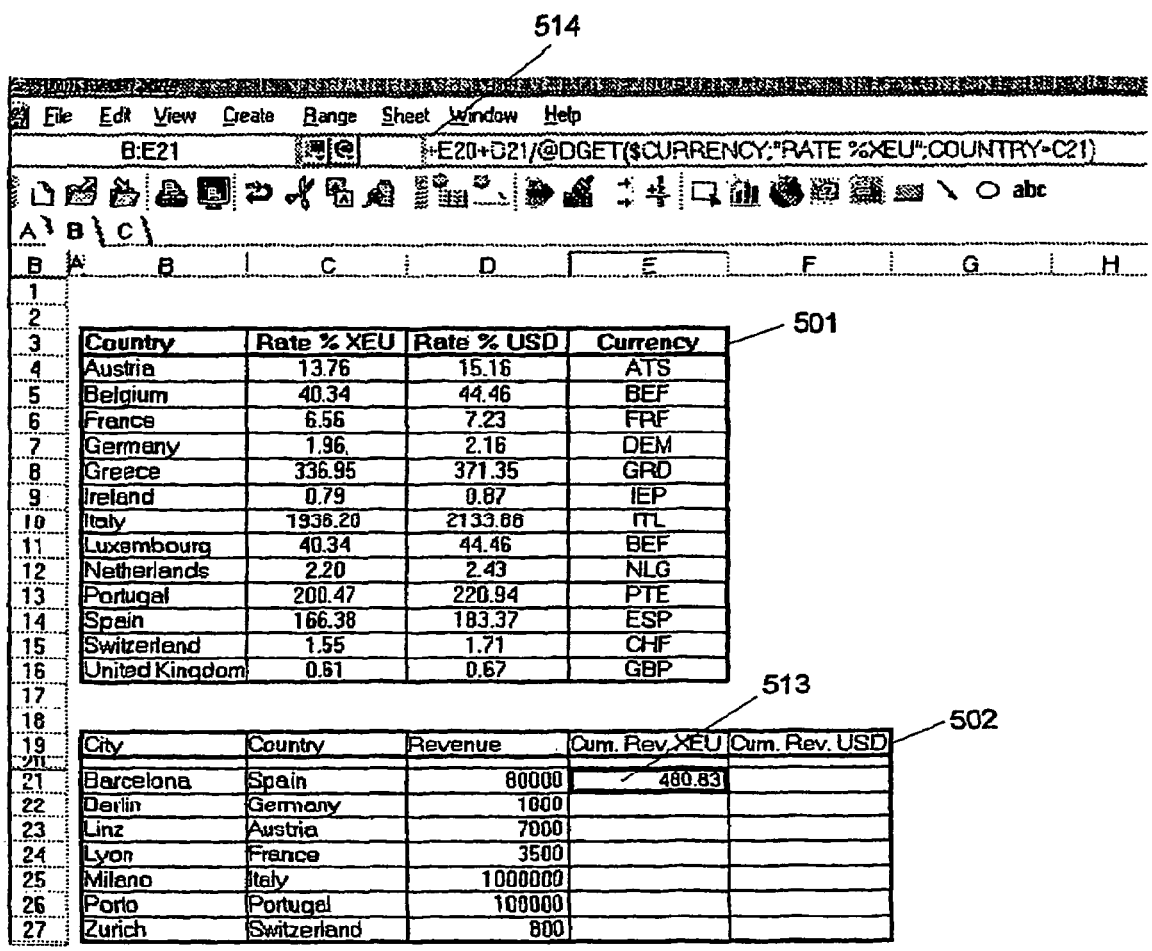

Finally the new push-button 641, entitled "Copy" allows, when hit, to copy onto the currently selected cell the content of the new display window 642, so that it takes a value as shown by the display window 643. Assuming that the spreadsheet user clicks on this "Copy" push-button with the pointing device 105, then the user interface displayed on the display device, as previously described in FIG. 5A, is updated according to the FIG. 5B. The content of the currently selected cell, as shown in the edit window 514, is the same as the one found in the display window 642 of the content dependent on-line Help information dialog box 640, and takes the same value, shown in 513, than the one found in the display window 643 of the content dependent on-line Help information dialog box 640. This scenario clearly illustrates that in the preferred embodiment of the proposed invention, the spreadsheet user has received the right level of on-line Help information.

D. Content Dependent Help Method

Figure 4:
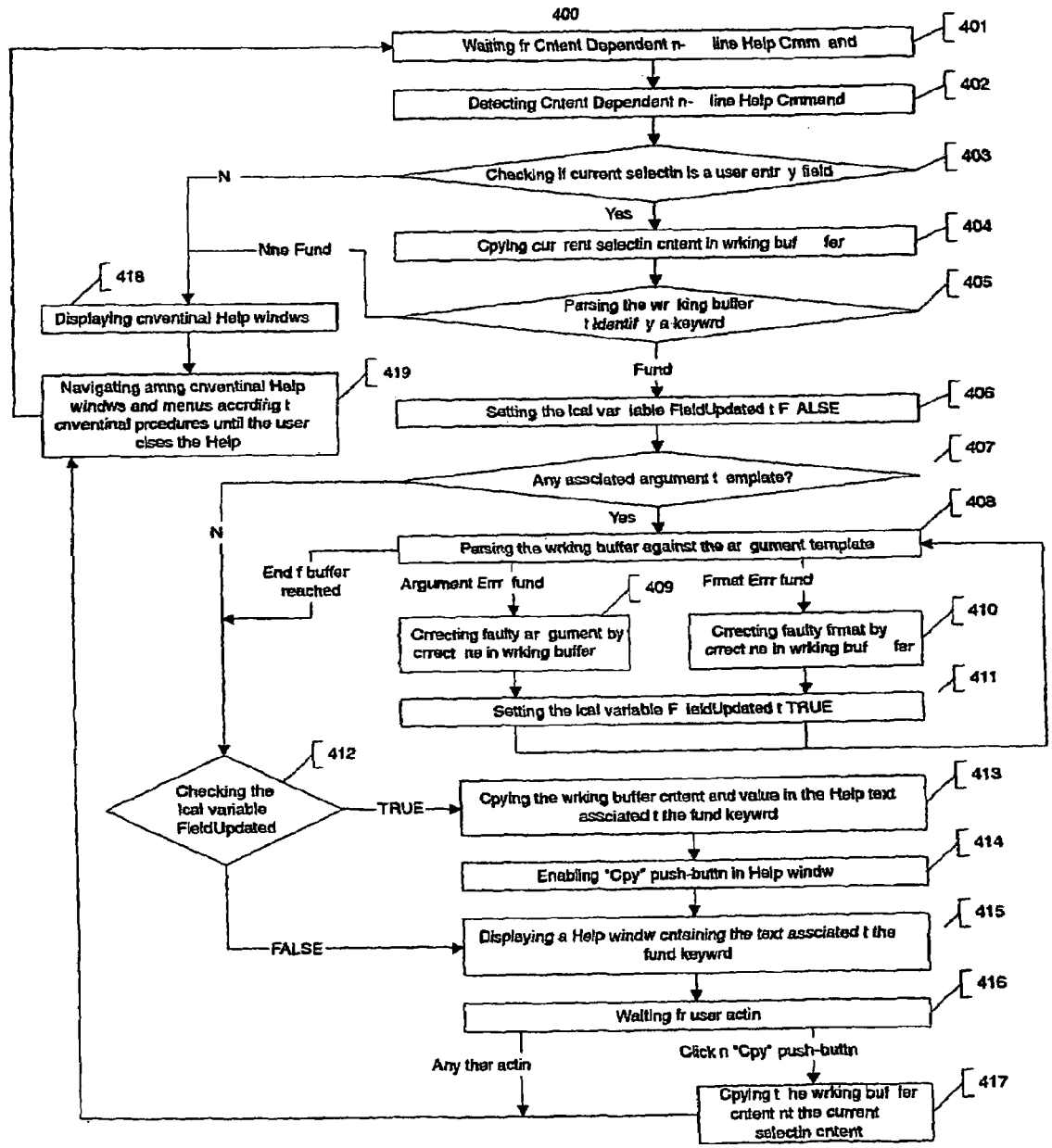
FIGS. 4 is a flow chart illustrating a preferred method for the content dependent Help information construction operation according to the present invention.

The method for building and then displaying content dependent on-line Help information to take advantage of the present invention can be summarised in flowchart 400 shown in FIG. 4. This method can be seen as the processing of the Content Dependent on-line Help command.

At step 401, the method is in its default state, waiting for an event to initiate the process.

At step 402, the Content Dependent on-line Help command is detected, as a result of an user action. This action may be for instance a specific combination of key on the keyboard 104, or the click of the pointing device 105 on a specific button, or any other similar means not further specified here.

At step 403, a test is performed to check if the currently selected object comprises a user entry field. In a spreadsheet environment, for instance, a test is performed to check if the currently selected object is a cell (and not a push-button, a graph or another object without user entry field). If it is the case, then control is given to step 404; otherwise control is given to step 418.

At step 404, the content of the currently selected object is copied onto a working buffer.

At step 405, a parsing operation is performed on the content of the working buffer to identify any keyword present in the first field "Keyword" 302 of the CDK table 300. Various parsing techniques can be used for this purpose; they are implementation dependent. It is only assumed that the parsing operation is done from the left to the right. If none keyword is found, then control is given to step 418; otherwise the corresponding record 301 of the CDK table 300 is memorized with its fields "Keyword" 302, "Parameter Template" 303 and "TextPtr" 304, before giving control to step 406.

At step 406, a local variable named "FieldUpdated" is initialised to the default value FALSE.

At step 407, a test is performed on the "Parameter Template" field 303 found at step 405 to check if it is empty or not. If it is the case, then control is given to step 412; otherwise control is given to step 408.

At step 408, the content of the working buffer is parsed against the "Parameter Template" field 303 found at step 405. This parsing resumes within the working buffer at the position resulting from the previous parsing operation done at step 405. This parsing operation identifies within the working buffer the one or plurality of parameters, if any, associated with the keyword and specified in the "Parameter Template" and verifies:

first, that the format of said parameters, if any, within the working buffer, follows the formats specified in the "Parameter Template" field 303 found at step 405, and second, that said parameters, if any, within the working buffer follows the rules specified in the "Parameter Template" field 303 found at step 405.

Three different situations may result from this parsing operation.

If the end of the working buffer is reached without encountering any problem, then control is given to step 412.

If a parameter error is found (if one or a plurality of parameters, if any, does not satisfy the rules specified in the "Parameter Template"), then control is given to step 409.

If a format error is found (if one or a plurality of parameters, if any, does not satisfy the formats specified in the "Parameter Template"), then control is given to step 411.

At step 409, the parameter error identified at step 408 is corrected according to the "Parameter Template" field 303 found at step 405. Then control is given to step 411.

At step 410, the format error identified at step 408 is corrected according to the "Parameter Template" field 303 found at step 405.

At step 411, the method sets the local variable FieldUpdated to the value TRUE, and then control is given to the step 408 for continuing parsing the content of the working buffer until its end is reached.

At step 412, a test is performed to check if the local variable FieldUpdated is found equal to TRUE. If it is the case, then control is given to step 413; otherwise control is given to step 415.

At step 413, the content of the working buffer and the value it takes are copied in the Help text pointed by the "TextPtr" field 304, so that when displayed, they overwrite the default text (generally an hypertext reference pointing to a dummy example description).

At step 414, the "Copy" push-button 641 is enabled.

At step 415, an on-line Help information dialog box like 640 is displayed, which contains as Help information the text pointed by the "TextPtr" field 304, possibly updated according to the operations performed during step 413.

At step 416, a user action on the displayed dialog box like 640 is waited for. If a click on the "Copy" push-button 641 is detected, then control is given to step 417; otherwise control is given to step 419.

At step 417, the content of the working buffer is copied onto the currently selected object.

At step 418, the conventional on-line Help information is displayed according to conventional methods.

At step 419, control is given to conventional methods for letting the spreadsheet user navigate among conventional on-line Help information dialog boxes, until the user spreadsheet decides to close the on-line Help tool. Then control is given back to the initial step, waiting for a new Content Dependent online Help command.

Alternate Embodiments

The Content Dependent Help method and system according to the present invention may be used advantageously in those environments where elements of information are organised as multidimensional tables having more than three dimensions. More generally, the present invention may be used advantageously in office and business environments and more particularly in relational databases, text editors, presentation tools, graphic suites, project management tools, integrated development and programming tools where elements of information can be edited by the user according to predefined rules and syntax.

While the invention has been particularly shown and described with reference to a preferred embodiment, it will be understood that various changes in form and detail may be made therein without departing from the spirit, and scope of the invention.

What is claimed is:

1. A computer-implemented method for providing on-line help information in an application comprising at least one object, the on-line help information being dependent on content of a selected object, the method comprising:
   detecting an on-line help command as a result of a user action, the user employing the application;
   identifying the selected object;
   determining if the selected object comprises a user entry field of the application; and
   if the selected object comprises a user entry field:
      parsing the content of the user entry field to identify whether a predefined keyword is present, the predefined keyword being characterized by a character string;
   for the predefined keyword identified in the content of the user entry field:
      identifying predefined help information associated with the identified predefined keyword, the predefined help information specifying at least one parameter associated with the predefined keyword and at least one format and rule related to the at least one parameter;
      parsing content of the user entry field to identify therein the at least one parameter specified in the predefined help information;
      verifying that a format of the identified at least one parameter within the user entry filed satisfies the at least one format specified in the predefined help information;
      verifying that the identified at least one parameter within the user entry field satisfies the at least one rule specified in the predefined help information; and
      if the content of the user entry field does not satisfy the at least one format and/or rule specified in the predefined help information of the predefined keyword identified in the content of the user entry field:
         correcting content of the user entry field according to the at least one format or the at least one rule specified in the predefined help information, and displaying the corrected content to a user; and
      wherein the on-line help information comprises at least one predefined keyword recorded in a table, the table comprising for each predefined keyword:
   a character string identifying the predefined keyword; and
   help information, comprising:
      a parameter template specifying at least one parameter associated with the predefined keyword, and at least one format and rule related to the at least one parameter; and
      help text or a reference pointing to a location where the help text is recorded.

2. The method according to claim 1, further comprising:
   for the predefined keyword identified in the content of the user entry field:
      identifying a predefined help text in the help information associated with the identified keyword; and
      displaying the identified predefined help text.

3. The method according to claim 2, wherein displaying the identified predefined help text, comprises:
   copying the corrected content of the user entry field in the predefined help text.

4. The method according to claim 1, wherein identifying the content of the user entry field further comprises:
   copying the content of the user entry field to a working buffer.

5. The method according to claim 1, wherein correcting the content of the user entry field, further comprises:
   storing the corrected content in a working buffer.

6. The method according to claim 5, further comprising:
   copying onto the selected object, the corrected content of the working buffer as a result of a user action.

7. The method according to claim 5, further comprising:
   automatically copying onto the selected object, the corrected content of the working buffer.

8. The method according to claim 1, wherein the application is a multi-dimensional spreadsheet comprising a plurality of cells identified by a cell address along each dimension, the on-line help information being dependent on the content of a selected cell.

9. A computer-implemented method for providing on-line help information in an application comprising at least one object, the on-line help information being dependent on content of a selected object, the method comprising:
   detecting an on-line help command as a result of a user action, the user employing the application;
   identifying the selected object;
   determining if the selected object comprises a user entry field of the application; and
   if the selected object comprises a user entry field:
      parsing the content of the user entry field to identify whether a predefined keyword is present, the predefined keyword being characterized by a character string;
   for the predefined keyword identified in the content of the user entry field:
      identifying predefined help information associated with the identified predefined keyword, the predefined help information specifying at least one parameter associated with the predefined keyword and at least one format and rule related to the at least one parameter;
      parsing content of the user entry field to identify therein the at least one parameter specified in the predefined help information;
      verifying that a format of the identified at least one parameter within the user entry filed satisfies the at least one format specified in the predefined help information;
      verifying that the identified at least one parameter within the user entry field satisfies the at least one rule specified in the predefined help information; and
      if the content of the user entry field does not satisfy the at least one format and/or rule specified in the predefined help information of the predefined keyword identified in the content of the user entry field:

correcting content of the user entry field according to the at least one format or the at least one rule specified in the predefined help information, and displaying the corrected content to a user;
predefining at least one keyword; and
recording the at least one predefined keyword in a table, the table comprising for each predefined keyword:
a character string identifying the predefined keyword; and
help information, comprising:

a parameter template for specifying at least one parameter associated with the predefined keyword, and at least one format and rule related to the at least one parameter; and help text or a reference point to a location where the help text is recorded.

* * * * *